United States Patent [19]

Mansson et al.

[11] Patent Number: 5,285,487
[45] Date of Patent: Feb. 8, 1994

[54] SPACER FOR RETAINING FUEL RODS IN A NUCLEAR REACTOR FUEL ASSEMBLY

[75] Inventors: Ragnar Månsson; Olov Nylund, both of Västerås, Sweden; Clas-Göran Wiktor, Dietlikon, Switzerland

[73] Assignee: ABB Atom AB, Västerås, Sweden

[21] Appl. No.: 957,022

[22] Filed: Oct. 6, 1992

[30] Foreign Application Priority Data

Oct. 29, 1991 [SE] Sweden ............... 9103157-5

[51] Int. Cl.$^5$ ............................................. G21C 3/34
[52] U.S. Cl. ................................... 376/438; 376/439; 376/462; 376/448
[58] Field of Search ............... 376/438, 439, 446, 434, 376/448, 442, 440, 462; 976/DIG. 80, DIG. 83, DIG. 82

[56] References Cited

U.S. PATENT DOCUMENTS

| | | | |
|---|---|---|---|
| 3,176,762 | 4/1965 | Greenwood et al. | 376/442 |
| 3,369,973 | 2/1968 | Voigt et al. | 376/442 |
| 3,567,582 | 3/1971 | Jean-Paul L. Van Dievoet et al. | 376/442 |
| 3,746,617 | 7/1973 | Iwao et al. | 376/442 |
| 4,297,170 | 10/1981 | Leclercq | 376/442 |
| 4,416,852 | 11/1983 | Nylund | 376/438 |
| 4,885,127 | 12/1989 | Yokoyama | 376/462 |
| 5,096,660 | 3/1992 | Hembjer et al. | 376/438 |

*Primary Examiner*—Donald P. Walsh
*Assistant Examiner*—Meena Chelliah
*Attorney, Agent, or Firm*—Watson, Cole, Grindle & Watson

[57] ABSTRACT

A spacer for a nuclear reactor fuel assembly includes a cell-formed lattice-work for retaining parallel, elongated elements such as fuel rods (4) into a bundle of substantially square cross section. The cells are formed from tubular, preferably round sleeves (1). Each one of these offers a passage for one of the elements for mutually fixing these elements. Each spacer is formed from two sub-spacers (5) somewhat spaced-apart from each other in the longitudinal direction of the bundle. A first sub-spacer in a pair fixes elements lying substantially on one side of a diagonal through the bundle, and a second sub-spacer fixes the other elements such that elements passing through the sleeves (1) of the first sub-spacer pass, possibly with some exception, at the side of the sleeves in the second sub-spacer and vice versa.

10 Claims, 3 Drawing Sheets

SPACER FOR RETAINING FUEL RODS IN A NUCLEAR REACTOR FUEL ASSEMBLY

BACKGROUND OF THE INVENTION

The present invention relates to a spacer with a cell-formed lattice-work for retaining parallel, elongated elements such as fuel rods into a bundle in a nuclear reactor fuel assembly. In known embodiments, the spacers are normally arranged at a distance of 5–6 dm from each other along the bundle. In the arrangement referred to here, the cell-formed lattice is formed from tubular sleeves, each of which offers a passage for one of the above-mentioned elements in order to mutually fix the elements.

It is important that the spacers do not provide too high a resistance to the coolant flow which flows inside the fuel assembly along the bundle and through the spacers.

It is known to try to achieve lower spacer resistance and hence improved cooling in a boiling reactor with a fuel assembly in the form of an elongated polygonal channel in which the bundle of fuel rods is arranged. This has been done by the use of sub-spacers, each of which takes up only a part of the total cross section of the bundle and thus braces the fuel rods in this cross section only. Another known solution is to provide the bundle with spacers which alternately fix only the fuel rods positioned peripherally in the bundle (peripheral spacers), or the fuel rods located centrally inside the former fuel rods (central spacers).

The lattice-work in the above-mentioned known spacers consists of plate bands, standing on edge, which are arranged crosswise and form square cells. In certain types of reactors, this type of lattice-work provides less favourable cooling conditions than a lattice-work composed of tubular, preferably round sleeves because the sleeves can be fitted in a better way around the normally round fuel rods.

SUMMARY OF THE INVENTION

The present invention relates to a spacer whose cells are formed from tubular, preferably round sleeves, each of which offers a passage for one of the above-mentioned elements in order to mutually fix these elements into a bundle of substantially rectangular cross section.

According to the invention, each spacer comprises two sub-spacers arranged in a certain spaced relationship to each other in the longitudinal direction of the bundle. One of the sub-spacers in a pair fixes elements positioned substantially on one side of a diagonal through the bundle, and the other sub-spacer fixes the other elements in the bundle, such that elements passing through the sleeves of one sub-spacer pass—possibly with some exception—at the side of the sleeves in the other sub-spacer and vice versa.

By means of the invention a spacer is obtained in which the material area in one of the sub-spacers separated from each other is reduced to near half of the material area of a spacer in which all the sleeves lie in one and the same plane across the bundle. Since the material area of the lattice-work in a plane across the bundle is in direct relation to the resistance offered by the lattice-work to the coolant flow, the cooling of the fuel assembly is improved most considerably. The diagonal division of each spacer into two sub-spacers also provides an improved mixing of the coolant flow along the bundle.

According to a suitable embodiment of the invention, two associated sub-spacers are connected together by providing both sub-spacers with sleeves in the corners positioned on the above-mentioned diagonal such that elements in these corners of the bundle pass through sleeves arranged in both sub-spacers. In addition, the sub-spacers can be formed such that an element running centrally in the bundle passes through sleeves in both sub-spacers.

Each sub-spacer can be provided with a four-sided frame embracing the entire bundle. Inside this frame the sleeves are arranged in a substantially triangular formation resting against each other and two of the sides of the frame.

In fuel assemblies for nuclear reactors of BWR type, the bundle of elements is arranged in a channel for the coolant. In this type of fuel assemblies the frame can suitably be formed as a skirt hanging under the sleeves, the upper part of the skirt being fixed to the lower edge of the sleeves adjoining the frame. The upper part of the skirt is thereby perforated by a plurality of openings, into which fins have been inserted, which fins are intended to guide the coolant flowing through the fuel assembly towards the central parts of the bundle. In addition, the skirt rests against the walls of the channel and functions in such a way that coolant flowing along these walls is scraped off the walls and directed towards the centre of the bundle.

BRIEF DESCRIPTION OF THE DRAWINGS

The invention will be most readily understood with reference to the accompanying FIGS. 1–8, wherein.

DETAILED DESCRIPTION OF THE PREFERRED EMBODIMENT

Figure 1:
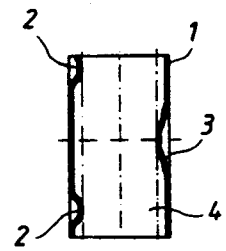
FIG. 1 shows one of the sleeves forming the lattice-work in the spacer.

In FIG. 1, 1 designates a tubular, preferably round sleeve included in the spacer, the sleeve having fixed supports 2 and a spring 3 opposite thereto. A fuel rod 4 is also indicated in FIG. 1.

Figure 2:
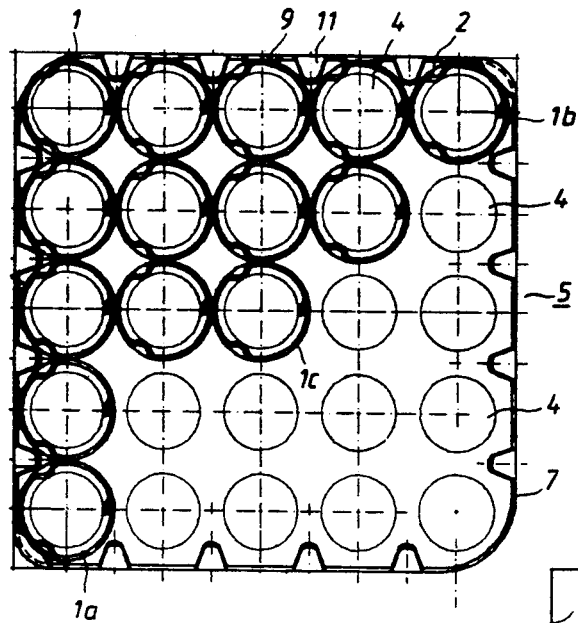
FIG. 2 shows one of the sub-spacers in a pair seen from above.

FIG. 2 shows one of the sub-spacers 5 in a pair. In FIG. 2, the same designations are used as in FIG. 1. As will be clear from FIG. 2, the bundle comprises altogether 25 fuel rods 4. The sub-spacer 5 contains only 14 sleeves 1 arranged on substantially one side of a diagonal through the bundle. Certain of the sleeves 1 lie on the actual diagonal and of these the corner sleeves 1a and 1b as well as the central sleeve 1c have corresponding sleeves 1a', 1b' and 1c' located in the same positions in the other sub-spacer 6 according to FIG. 5. Fuel rods 4 which are located in these positions in the bundle thus pass through sleeves 1 in both sub-spacers 5, 6, whereby the sub-spacers 5, 6 in one pair are fixed in relation to each other. This, in turn, means that all the fuel rods 4 in the bundle of a pair of sub-spacers 5, 6 are fixed in relation to each other.

Figure 3:
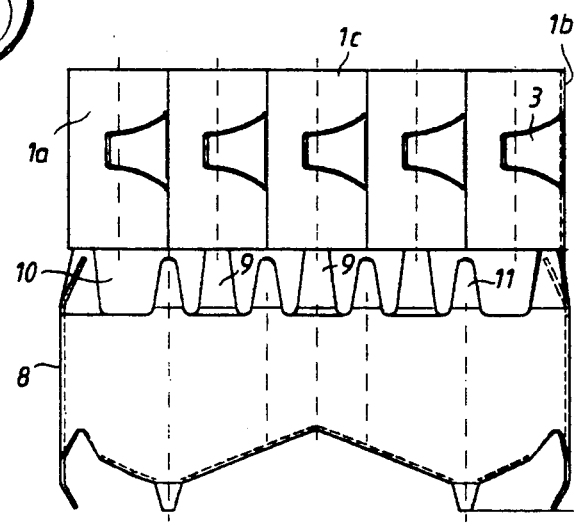
FIG. 3 shows the same sub-spacer seen from the righthand side.
Figure 4:
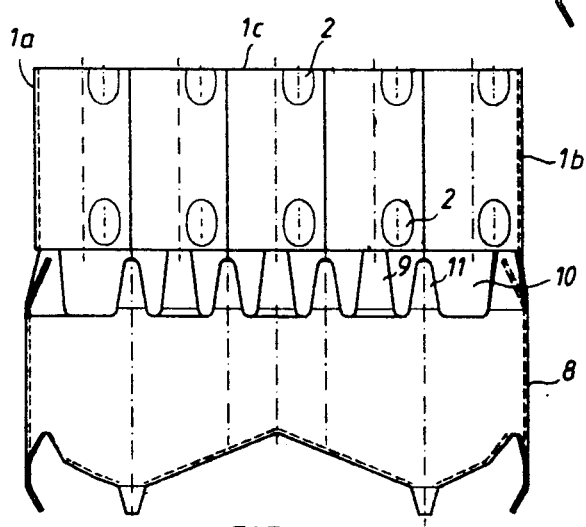
FIG. 4 shows the same sub-spacer seen from the front.

The sub-spacer 5 can be provided with a frame 7. In the current embodiment the frame 7 is formed as a square and the triangular lattice-work of sleeves 1 is supported on two sides by the frame 7. The frame 7 is formed as a skirt, the upper part of which, as will be clear from FIGS. 3 and 4, is connected by means of poles 9 to the lower edge of the outer sleeves 1. The upper part of the skirt 8 is provided by a number of openings 10. In these openings 10, fins 11 are arranged. The fins are intended to guide coolant flowing through the fuel assembly towards the central part of the bundle in order thus to improve the cooling of the bundle.

Figure 5:
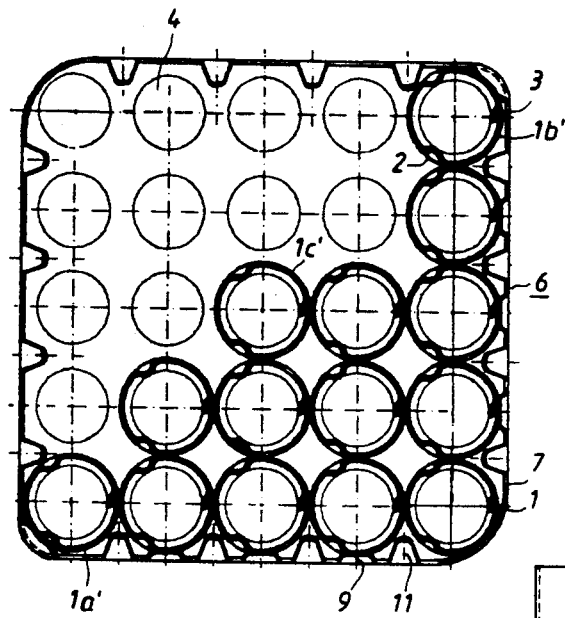
FIGS. 5–7 show in the same way the other sub-spacer in a pair.
Figure 6:
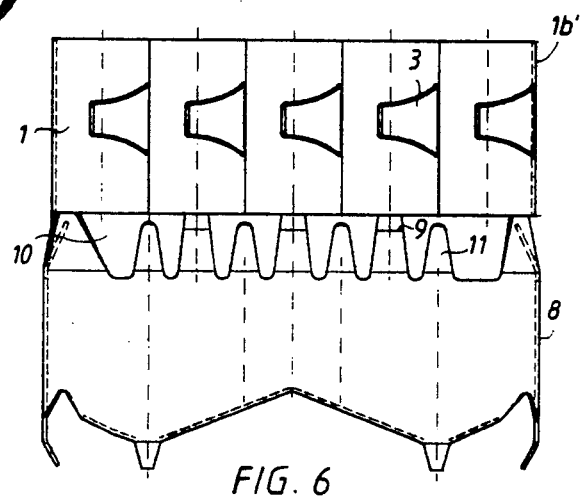
Figure 7:
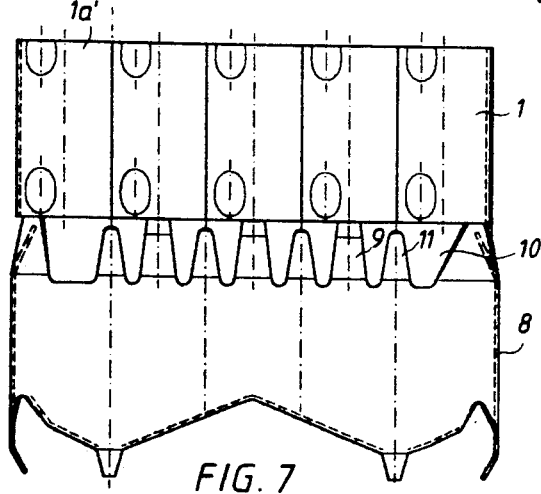

In FIGS. 5-7, which show the other sub-spacer 6, designations corresponding to those used in FIGS. 2-4 have been introduced.

Figure 8:
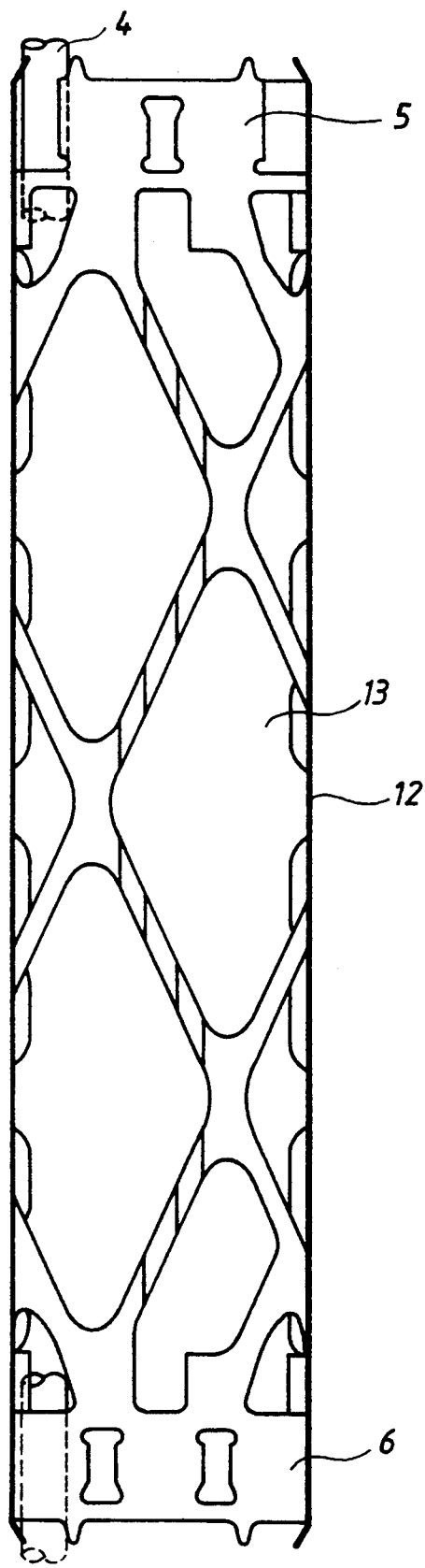
FIG. 8 shows how two sub-spacers in a pair can be joined to a square sleeve which is partially provided with openings.

FIG. 8 shows how two sub-spacers 5, 6 in a pair can be connected together with a long square sleeve 12 as an alternative to the frame 7 described above. The square sleeve is provided with a large number of openings 13. The sub-spacers 5, 6 are then placed, for example, at a distance of half a normal spacer (ca 3 dm) from each other.

To increase the turbulence further in the coolant, it would be possible to twist, on the bundle, a coherent pair of sub-spacers through 90° in relation to the following pair placed along the bundle, and so on, such that the flow along the bundle is guided in a spiral.

The steam which is generated in the fuel assembly is diverted more easily than the cooling water, and a thought behind the design is that the steam should take the path of least resistance through the sub-spacers, that is, through that part of the spacers which has no cells. In this way the steam, which prevents the cooling of the fuel rods, as opposed to the cooling water, should be brought as fast as possible upwards through the fuel assembly. The intention is for the cooling of the fuel rods to be considerably improved in this way.

We claim:

1. A spacer for a nuclear reactor fuel assembly, said spacer comprising a cell-formed lattice-work for retaining parallel, elongated elements such as fuel rods into a bundle with substantially rectangular cross section, said cells being formed from tubular sleeves, each one of said sleeves offering a passage for one of said elements in order to mutually fix said elements, each spacer comprising two sub-spacers (5, 6) arranged in a certain spaced relationship to each other in a longitudinal direction of the bundle, a first one of said sub-spacers in a pair fixing elements lying substantially on one side of a diagonal through the bundle, a second one of said sub-spacers fixing the other elements such that elements passing through the sleeves of said first spacer pass, possibly with some exception, at the side of the sleeves in said second sub-spacer and vice versa.

2. A spacer according to claim 1, wherein elements extending through a pair of associated sub-spacers (5, 6) at the corners thereof on said diagonal pass through sleeves (1a, 1b, 1a', 1b') arranged in both sub-spacers (5, 6), whereby said sub-spacers (5, 6) are fixed in relation to each other.

3. A spacer according to claim 2, wherein an element extending centrally in the bundle is fixed by means of sleeves (1c, 1c') arranged in both sub-spacers (5, 6).

4. A spacer according to claim 1, wherein each sub-spacer is provided with a four-sided frame (7) embracing the entire bundle.

5. A spacer according to claim 4, wherein inside said frame (7), sleeves (1) are arranged in a substantially triangular formation resting against each other and two of the sides of the frame (7).

6. A spacer according to claim 4, intended for a fuel assembly (4) with a rectangular channel containing said bundle, wherein the frame (7) consists of a skirt (8) hanging under the sleeves (1), the upper part of said skirt being fixed to the lower edge of the sleeves (1) adjoining the frame (7).

7. A spacer according to claim 6, wherein the upper part of the sleeve (8), which upper part adjoins the sleeves (1), is perforated by a plurality of openings (10).

8. A spacer according to claim 7, wherein fins (11) are arranged in the openings (10), said fins being intended to guide coolant flowing through the fuel assembly towards the central parts of the bundle.

9. A spacer according to claim 1, wherein pairs of sub-spacers (5, 6) which belong together are arranged at a distance of about half a normal spacer from each other.

10. A spacer according to claim 9, wherein the sub-spacers in a pair are joined together with a square-formed sleeve, the walls of which are provided with a plurality of openings.

* * * * *